Patented Apr. 15, 1952

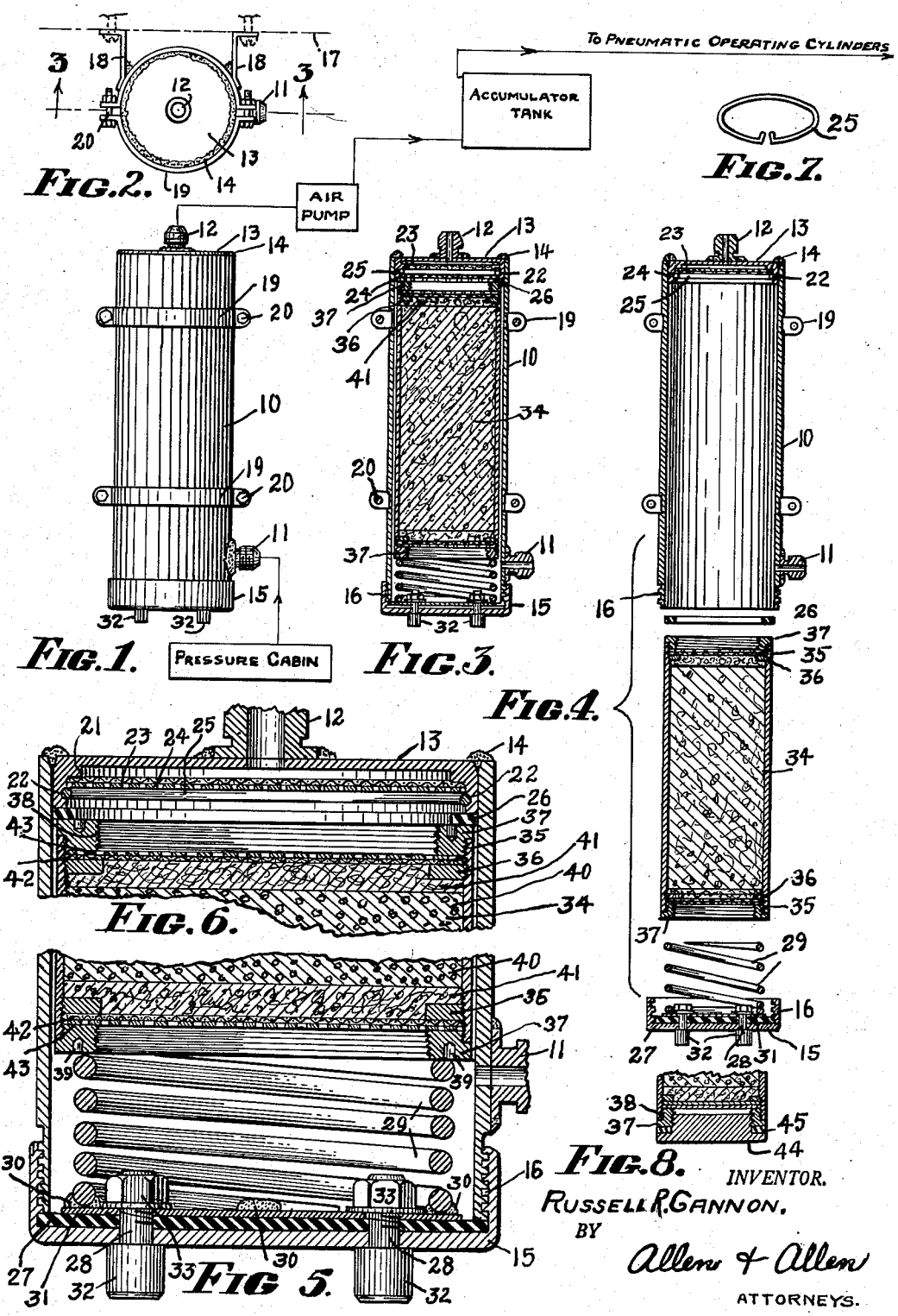

2,593,132

UNITED STATES PATENT OFFICE 2,593,132

CONTAINER FOR DESICCANT MATERIAL

Russell R. Gannon, Cincinnati, Ohio

Application December 5, 1947, Serial No. 789,950

1 Claim. (Cl. 183—4.8)

This invention relates to containers for desiccant materials such as calcium sulphate base material, for example, in installations where moisture-free air is desirable or necessary. While my invention is applicable to all sorts of installations, I have devised it particularly for use in connection with pneumatically operated devices in high altitude aircraft.

The modern high altitude aircraft with a pressurized cabin is designed to fly at an altitude of perhaps 30,000 feet. Such aircraft usually have certain mechanisms which are operated pneumatically. For example in bomber aircraft the bomb bay doors may be pneumatically operated. If the air used in the pneumatic system contains even a small amount of moisture, that moisture will freeze at the temperature encountered at such altitudes almost instantaneously. Such freezing will, of course, cause malfunction of the particular pneumatic device in question.

It is usual to provide an accumulator tank of some sort to store compressed air at a relatively high pressure, as a source of pneumatic power for whatever devices are to be pneumatically operated. Such accumulator would normally be replenished from the air in the pressurized cabin, or the ambient air. This air would certainly contain a normal amount of moisture, which is continually being added to by the breathing of the occupants, if cabin air is used. When this air is compressed into the accumulator tank, this moisture is in the vapor phase, and goes over to the liquid phase as the tank cools. As soon as it is released in order to do useful work, the rapid expansion causes further condensation of the water vapor, and this condensed moisture freezes almost instantaneously.

Various materials, such for example as calcium sulphate, have excellent desiccant properties, i. e. they will remove moisture from air. Calcium sulphate also has an advantageous property, in that, when it has become pretty well saturated with moisture, it can be revitalized by baking the moisture out of it.

With the foregoing considerations in view, it is an object of my invention to provide a container of desiccant material in the form of an exchangeable unit, so that when a unit is saturated it may be removed for revitalization and replaced with a fresh unit. To this end it is a further object of my invention to provide a container unit with means for closing it tightly until such time as it is to be used. It is a still further object of my invention to provide such a unit which is so arranged that it will have a long life, whereby its cost can be prorated over a long period of time.

In connection with a container unit as outlined above, it is another object of my invention to provide a holder within which said container unit is held while in use. It is still another object of my invention to provide such a holder within which the container unit will be tightly sealed, so that the only moisture which will be adsorbed by the desiccant contents will be that which is contained in the air which will be used to actuate the several pneumatic devices mentioned above.

These and other objects of my invention, which I shall describe in more detail hereinafter, or which will become apparent to one skilled in the art as this specification proceeds, I accomplish by that construction and arrangement of parts, of which I shall now describe an exemplary embodiment.

Reference is made to the drawings forming a part hereof, and in which:

Fig. 1 is a schematic view of a pneumatic circuit, showing my invention in front elevation.

Fig. 2 is a plan view of my invention as seen from the top of Fig. 1.

Fig. 3 is a cross sectional view, taken on the line 3—3 of Fig. 2.

Fig. 4 is an exploded view in cross section, showing more clearly the relationship of the parts shown in Fig. 3.

Fig. 5 is an enlarged fragmentary cross sectional view, corresponding to the lower portion of Fig. 3.

Fig. 6 is an enlarged fragmentary cross sectional view, corresponding to the upper portion of Fig. 3.

Fig. 7 is a perspective view of one of the spring retaining rings, and

Fig. 8 is a fragmentary cross sectional view of one end of the container unit with its cap in place.

While, as pointed out above, my invention has numerous applications, I shall describe it as installed in a high altitude aircraft having devices which are pneumatically actuated. Briefly, in the practice of my invention, therefore, I place my invention in a line between the source of air and the compressor or pump. Thus, in Fig. 1 I have shown schematically an air pump or compressor which takes air from the pressurized cabin or other source and charges it into an accumulator, which serves as a reservoir of compressed air for the various pneumatically operated devices on the aircraft. At 10, I have indicated generally the device of my invention, and it will be observed that all the air with which the accumulator is charged, is drawn from the pressure cabin or other source through the device 10, so that the air in the accumulator will have a low point temperature lower than any expected ambient flying temperature.

That portion of the device which is visible in Figs. 1 and 2 is the holder, or outer member, within which the container unit proper is held. The holder 10 may be provided with an intake fitting 11 and an exhaust fitting 12. It is preferably of cylindrical form and is permanently closed at one end by means of a head 13, welded or otherwise secured thereto as at 14. The other end is closed by a head 15 which has threaded engagement with the cylinder, as indicated at 16. The holder 10 may be fastened to a portion of the aircraft structure (indicated by the broken line 17 in Fig. 2) by the straps 18 which form semicircular seats, and the straps 19 which are bolted to the straps 18 as at 20. Thus, the holder in its entirety may be removed by unfastening the bolts 20 and disengaging the fittings 11 and 12 from their respective lines. Normally, however, the holder 10 will not be removed, but only the container unit itself (which will be described hereinafter) will be removed by unscrewing the head 15.

As best seen in Fig. 6, the head 13 on its inside is provided with a shoulder 21 and adjacent thereto a groove 22. A circular piece of fine mesh screen 23, backed up by a foraminous circular plate 24 is held against the shoulder 21 by a spring retaining ring 25. An annular gasket 26 bearing against the edge of the head provides an abutment for the container proper.

As most clearly seen in Fig. 5, the head 15, which has threaded engagement with the cylindrical body 10 at 16, has an annular gasket 27, and the head is provided with holes for the passage of the bolts 28. A relatively heavy coil spring 29 is secured (as by welding 30) to a plate 31 which also has holes to accept the bolts 28. The bolts 28 have heads 32 which serve as abutments for a spanner in screwing on and unscrewing the head 15, and by means of the nuts 33, the plate 31 is secured to the head 15 with the gasket 27 therebetween. Thus, the spring 29 is also secured to the head 15, and will securely hold in place the inner container, which I shall describe hereinafter. It will be clear that the structure heretofore described is a sealed structure, and air can have access to the inside of the holder only through the fittings 11 and 12.

Coming now to a description of the container proper, I have indicated this generally at 34, and it is also preferably cylindrical in shape, and of a diameter to slide easily into the member 10. The cylindrical member 34 is internally threaded at both ends as shown at 35 to accept the threaded ring 36 and the threaded cap ring 37. The latter is itself internally threaded at 38 and is provided with holes 39 for a spanner wrench for use in assembly.

The filling of desiccant material, preferably having a calcium sulphate base, and known as GAC-3 (Wright Field Specifications) indicated at 40 terminates at both ends of the container with a layer of fine glass wool 41. The rings 36 are threaded into the ends of the container and provide seats for the circular pieces of fine mesh screen 42 and the foraminous plates 43, which are held in place by the cap rings 37.

When the device is completely assembled, as seen in Fig. 3, the container 10 is held tightly against the gasket 26 by the head 15 and its associated spring 29 which bears against the cap ring 37. Air drawn through the fitting 11 must pass through the first foraminous plate 43, screen 42 and glass wool layer 41 before contacting the desiccant material 40. After passing through the material 40, it must again pass through the glass wool layer 41, screen 42 and plate 43; and finally, before passing out of the fitting 12 the air again passes through the plate 24 and screen 23. Thus the screens 42 and layers of glass wool 41 prevent the desiccant material 40 from being contaminated by foreign matter, and the screen 23 protects the rest of the system during replacement of the container 10.

When the desiccant material in the container has become fairly well saturated, the head 15 is unscrewed and the entire container unit is removed and may be replaced by another fresh identical unit. The saturated unit may then be baked out to remove the adsorbed moisture.

The replacement container unit, or the baked out and revitalized unit 34 can be stored and kept dry by means of the supplementary caps 44 shown in Fig. 8. The caps 44 are threaded to engage in the threads 38 in the cap rings 37, and are provided with the gaskets 45, which are preferably adhesively secured to the caps 44. A unit 34 with the caps 44 in place is substantially hermetically sealed and can be kept dry for long periods of time. For use it is only necessary to remove the caps 44 (together with their gaskets 45) and slip the unit 34 into the member 10, securing the head 15 tightly in place.

It should be noted that the construction and arrangement of parts is such, that the container unit 34 can easily be replaced without disturbing the intake connection with the fitting 11. It is thus a matter of a few seconds only, to make the replacement.

It will be clear that numerous modifications may be made in my invention without departing from the spirit thereof. I therefore do not intend to limit myself in any way except as set forth in the claim which follows.

Having now fully described my invention, what I claim as new and desire to secure by Letters Patent is:

In a pneumatic circuit, a container for desiccant material, comprising an outer member constituting a holder, and an inner member having end walls provided with openings and constituting the container proper, said holder being generally of cylindrical shape and having one end permanently closed except for a port fitting, there being also a port fitting adjacent the other end, said port fittings being connected to place said holder in said pneumatic circuit, said other end having a removable closure separate from said last mentioned port fitting, whereby said inner member may be inserted and removed without disturbing the connections between said holder and said pneumatic circuit, said container proper being internally threaded at each end, and there being an externally threaded ring in engagement with said threads at each end to constitute internal shoulders adjacent each end thereof, a fine mesh screen resting on each of said shoulders, a foraminous plate resting on each of said shoulders over said screens, and an externally threaded annular retaining member engaged in said first mentioned threads to hold said screen and plates securely against said shoulders.

RUSSELL R. GANNON.

REFERENCES CITED

The following references are of record in the file of this patent:

UNITED STATES PATENTS

| Number | Name | Date |
| --- | --- | --- |
| 1,645,364 | Weaver | Oct. 11, 1927 |
| 2,106,218 | Krieck | Jan. 25, 1938 |
| 2,116,537 | Miller | May 10, 1938 |
| 2,225,990 | Henry | Dec. 24, 1940 |
| 2,325,657 | Burkness | Aug. 3, 1943 |
| 2,398,830 | Hamilton | Apr. 23, 1946 |